United States Patent
Rao et al.

(10) Patent No.: US 12,518,181 B2
(45) Date of Patent: Jan. 6, 2026

(54) SCALABLE ARCHITECTURE FOR MACHINE LEARNING MODEL REUSE

(71) Applicant: SAP SE, Walldorf (DE)

(72) Inventors: Ranjith Pavanje Raja Rao, Bangalore (IN); Panish Ramakrishna, Bangalore (IN); Ashutosh Patel, Bangalore (IN); Nithya Rajagopalan, Bangalore (IN)

(73) Assignee: SAP SE, Walldorf (DE)

( * ) Notice: Subject to any disclaimer, the term of this patent is extended or adjusted under 35 U.S.C. 154(b) by 684 days.

(21) Appl. No.: 16/655,886

(22) Filed: Oct. 17, 2019

(65) Prior Publication Data

US 2021/0117819 A1    Apr. 22, 2021

(51) Int. Cl.
*G06N 5/04*     (2023.01)
*G06F 16/904*   (2019.01)
*G06N 20/00*    (2019.01)

(52) U.S. Cl.
CPC ............. *G06N 5/04* (2013.01); *G06F 16/904* (2019.01); *G06N 20/00* (2019.01)

(58) Field of Classification Search
CPC ......... G06N 5/04; G06N 20/00; G06F 16/904
USPC ......................................................... 706/12
See application file for complete search history.

(56) References Cited

U.S. PATENT DOCUMENTS

| | | | |
|---|---|---|---|
| 10,552,739 B1* | 2/2020 | Rausch | H04L 67/1097 |
| 2017/0185921 A1* | 6/2017 | Zhang | G06N 20/00 |
| 2017/0286526 A1* | 10/2017 | Bar-Or | G06F 16/248 |
| 2019/0102700 A1* | 4/2019 | Babu | G06N 20/00 |
| 2020/0057958 A1* | 2/2020 | Moore | G06N 20/00 |
| 2020/0097847 A1* | 3/2020 | Convertino | G06N 20/00 |
| 2020/0175416 A1* | 6/2020 | Zhao | G06N 20/00 |
| 2021/0097444 A1* | 4/2021 | Bansal | G06F 9/5066 |

\* cited by examiner

*Primary Examiner* — Hope C Sheffield
(74) *Attorney, Agent, or Firm* — Klarquist Sparkman, LLP

(57) ABSTRACT

A computing architecture is optimized for the reuse of machine learning model. A request is received for a machine learning model recommendation that specifies parameters associated with a desired machine learning model (e.g., schema, etc.). Thereafter, a machine learning-based discovery model, recommends at least one machine learning model (to reuse) based on the parameters specified in the request. Next, data characterizing the recommended at least one machine learning model is provided (e.g., loaded into memory, displayed in a graphical user interface, transmitted to a remote computing system, and/or stored in physical persistence, etc.). In some variations, a graphical user interface can be rendered that allows a client application to select one of the recommended machine learning models and, further optionally, to activate the selected machine learning models. Related apparatus, systems, techniques and articles are also described.

16 Claims, 5 Drawing Sheets

Enrichment Admin

Below are the List of models you can use for Enrichment:

[Refresh]

☐ 🗃 bag_of_words.zip (2804174 Thu Jun 20 10:08:38 2019)
☐ 🗃 ACTIVE_MODEL
☐ 🗃 sample_bagofwords_model.zip (2804174 Thu Jun 20 10:32:02 2019)

Upload Model File

1. Select the Model you want to upload. (zip file)

[Choose file]

2. Upload file to server.

[Upload]

[Delete Selected] [Activate Selected]

FIG. 3

SCALABLE ARCHITECTURE FOR MACHINE LEARNING MODEL REUSE

TECHNICAL FIELD

The subject matter described herein relates to a computing architecture that allows the reuse of machine learning models across different applications.

BACKGROUND

Applications and services are increasingly using machine learning models to provide to an enhanced user experience and for other purposes. Such machine learning functionality is often created on an ad-hoc basis for each application. As such, the underlying functionality is rarely able to reused without significant modification by developers. Furthermore, architectures providing such types of machine learning are typically not scalable nor do they allow for easy expansion of such models.

SUMMARY

In a first aspect, a request for a recommendation for a machine learning model is received that encapsulates parameters for a desired machine learning model. Thereafter, at least one recommended machine learning model responsive to the request is identified by a machine learning-based discovery model using the parameters. Data is then provided that characterizes the at least one recommended machine learning model.

Providing of the data can include one or more of: causing information describing the at least one recommended machine learning model to be displayed in a graphical user interface on a client computing device, loading the data into memory, storing the data into physical persistence, or transmitting the data to a remote computing device.

User-generated input can be received selecting one of the at least one recommended machine learning model displayed in the graphical user interface. Such a section can cause the selected recommended machine learning model to be activated. The encapsulated parameters can include a schema for the desired machine learning model.

An aggregator layer can search a model repository for common fields within schemas of multiple models within such model repository and can form a link amongst such multiple models to form an output from such multiple models.

The discovery model can include one or more types of machine learning models including a neural network.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for improved techniques for identifying potential machine learning models that can be reused in connection with new applications and/or services. As one example, the current subject matters allows for the discovery of models from a model lake and for the recommendation of APIs and aggregators for new applications and/or services.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 2 is a screen view of an administration page rendered by the computing architecture of FIG. 1;

FIG. 3 is a screen view by an enrichment application rendered by the computing architecture of FIG. 1;

DETAILED DESCRIPTION

The current subject matter provides a computing architecture that allows for the reuse of machine learning/artificial intelligence (AI) models (collectively referred to herein as machine learning models) and/or the underlying data used to train such models. In particular, as will be described further below, a user can provide a description of the problem to be addressed and a recommendation can be provided to the user. Such recommendation, in turn, can be provided using one or more machine learning models (e.g., a neutral network model). In other words, with the current subject matter, a first machine learning model can be used to recommend which of a plurality of other available machine learning models can be used to address the described problem.

Figure 1:
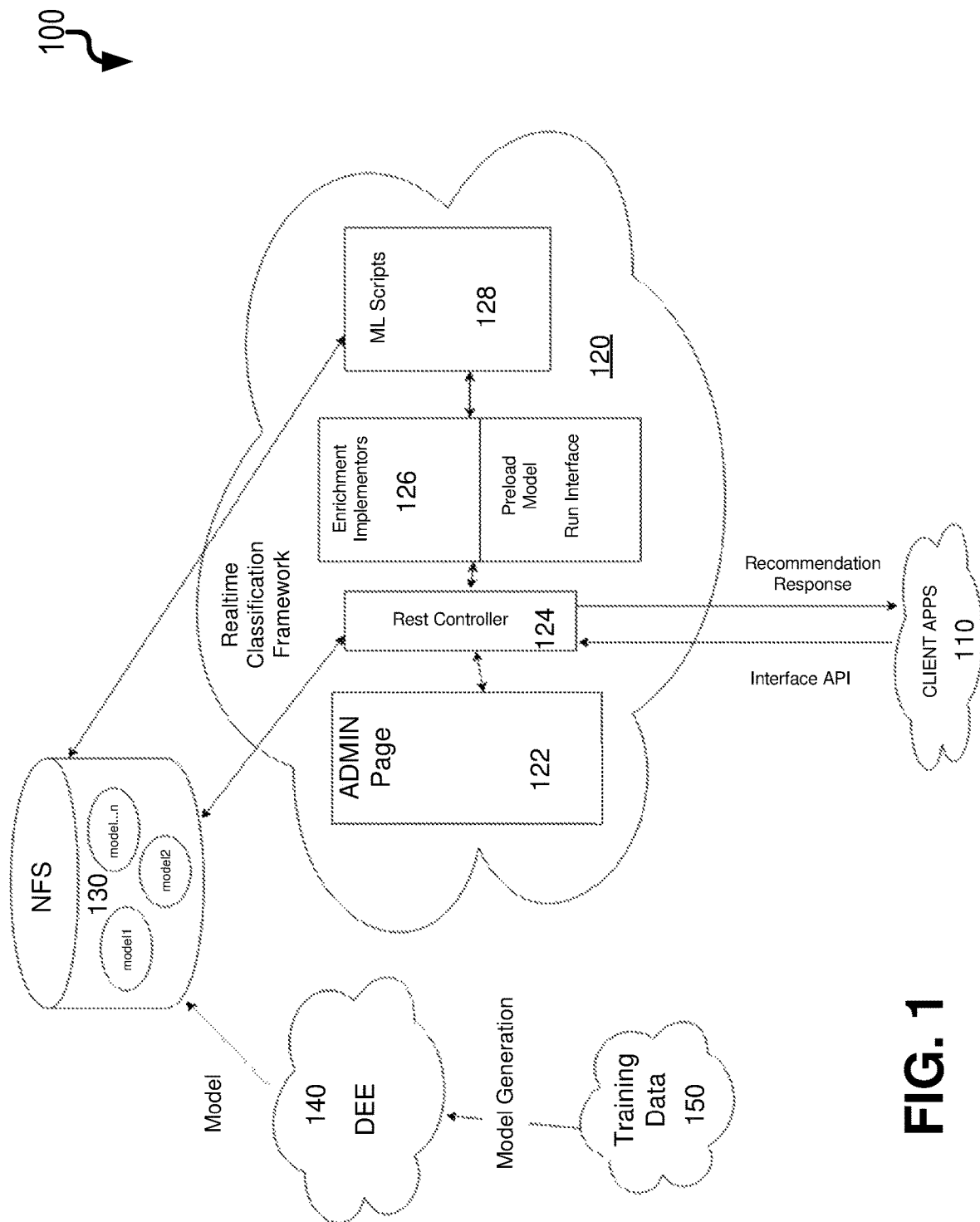
FIG. 1 is a diagram illustrating a computing architecture for reusing machine learning models.

FIG. 1 is a diagram 100 of a computing architecture for the reuse of machine learning models in which a client application 110 can poll a real-time classification framework 120 in order to get a recommendation for a machine learning model to use for a particular problem. The client application 110 can be executed by one or more remote computing devices and can access the classification framework 120 via the Internet or a local network. The classification framework 120 can comprise a dedicated server or series of servers and/or it can comprise a collection of cloud-based services.

The client application 110 can send a request to the classification framework 120 that specifies the problem being addressed. The response to such a request by the classification framework 120 can comprise an application programming interface (API) for a particular machine learning model (or ensemble of models). The classification framework 120 can include a REST (representational state transfer) controller 124 that can implement an aggregator layer as described below. The classification framework 120 can be a general framework having an implementor for each of numerous use cases (client apps that use the solution). The apps can send the detail s(request inputs) to the classification framework 120 which can be consumed by the specific implementor, processed and fed to the discovery model to predict the best model from the data lake for the specified request.

A Data Enrichment Environment (DEE) 140 can provide an interface for users to enrich their various computer-implemented processes with artificial intelligence/machine learning algorithms. The DEE 140 can be a spring boot-based multi-tenant microservice which can use various machine learning scripts to run inference on large data sets and predict outcomes or otherwise provide classifications (e.g., tensor flow libraries to handle machine learning part of model generation and inference, etc.). In one example relating to procurement, spend visibility(SV) customers can enrich invoice/supplier data using one or more artificial intelligence/machine learning algorithms. Following this example, the DEE 140 can use a PYTHON machine learning script to run inference on large body of invoice CSV's and can predict corresponding UNSPSC/ACT codes. Training data can be maintained in a training data repository 150. Such repository 150 can be, for example, a database such as an in-memory database in which data is loaded into memory from physical persistence for operations to be conducted thereon (e.g., modification, reporting, etc.).

The DEE 140 can be used to generate a plurality of models which, in turn, are stored in a model repository 130. Each model stored within the model repository 130 (forming a pool of different types of models) can include metadata or other characteristics that describe the schema and/or functionality of the corresponding models. The model repository 130 can be accessed by the classification framework 120 (via element 129). The models within the model repository 130 can be offline model loads (i.e., machine learning models, natural language processing models, etc.) and/or online models (i.e., models generated on the fly using the available data, etc.) created by various external users. Online model can be generated within the system especially when there are extensive amounts of user-generated analytical data. Plugins can extract this data so that a model generation algorithm can be run to build a model which can then be stored in a model pool. These activities can occur within the classification framework using the analytical data and can be automated. The offline models can be uploaded, for example, using an administration UI page (and such models can be created outside the system).

Figure 2:
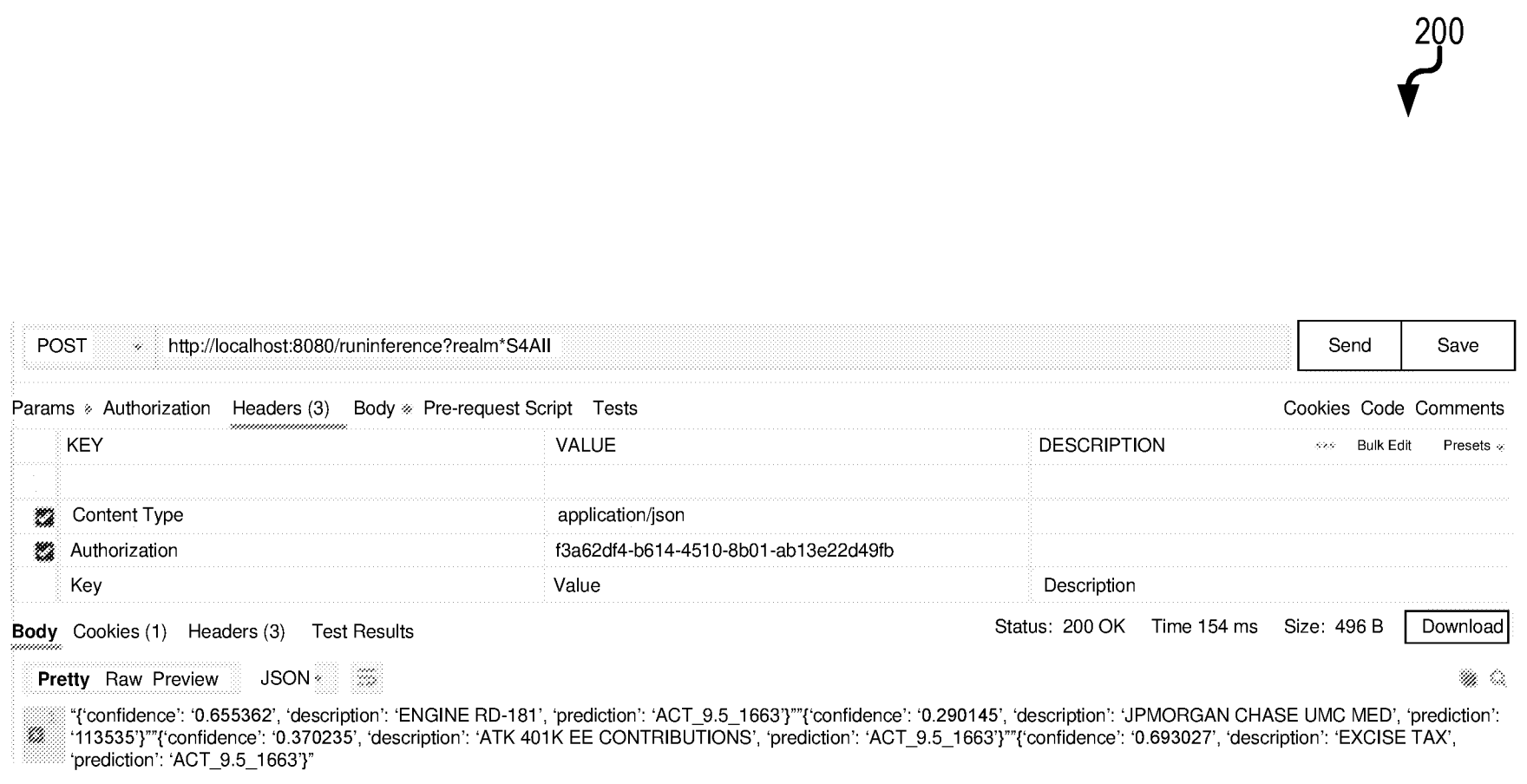

The classification framework 120 can cause various pages to be rendered (in a graphical user interface such as a web browser) including an administration page 122. The administration page 122 can provide an interface by which models stored in the model repository 130 can be managed. For example, the administration page 122 can list some or all available models and allow them to be deleted, uploaded, activated, or otherwise modified. An example view of an administration page 122 is shown in diagram 200 of FIG. 2.

An enrichment application 126 can be executed by the classification framework 120 and provide various mechanisms by which a selected model (or models) can be enriched. The enrichment application 126 can also provide for various mechanisms for preloading selected models (describe this further) and for running inference (i.e., training such models, etc.). An example of an interface provided by the enrichment application 126 is shown in diagram 300 of FIG. 3. As noted, diagram 300 illustrates proposed models that can be used which can be deleted or activated. Mechanisms are also provided to allow for the uploading of models (i.e., provision of externally created models). The enrichment application 126 can expose an end-point and the administration page 122. The endpoint, in this regard, is the API exposed for the calling client application 110 to get the recommendation for which model or models to use. The calling client application 110 can pass on a list of descriptions to the API and the API can return recommendations (optionally with a certain level of confidence).

As noted above, the client application 110 sends a request to the classification framework 110 for recommend machine learning models. Such a request can specify parameters such as application, request type, technical stack, input type (e.g., JSON, file type, etc.), type of desired prediction (classification, score, recommendation, etc.), desired schema, etc. The classification framework 124 using the request can extract features from such request and input them into a discovery model. The discovery model, in turn, is a machine learning model that is trained to provide the recommended machine learning model or machine learning models from the model repository 130. The discovery model can take various forms including a logistic regression model, a neural network model, a Random Forest model, a support vector machine and the like. In some cases, the schema of the desired model is input into the discovery model. The output of the discovery model can be API corresponding to a recommended model to use if an API is already available. If the API is not already available, the classification framework can automatically build an aggregator layer (forming part of the REST controller 124) using a template. The aggregator layer can act to combine (i.e., aggregate) outputs from different models and send the same to the requesting client application 110.

As noted above, the aggregator layer forms part of the REST controller 124 and can take the inputs from different schemas and can be aware of the input/output of each machine learning model. The aggregator layer can search for common fields within schemas and form a link to form an output from multiple models. As an example, Model1 takes input as PODescription and SupplierName and output is Commodity code. Model2 takes input as Supplier and output is RiskFactor. If a new application has input as PODescription and wants a prediction on RiskFactor, the aggregator layer can combine the outputs of Model1 and Model2 automatically.

Figure 4:
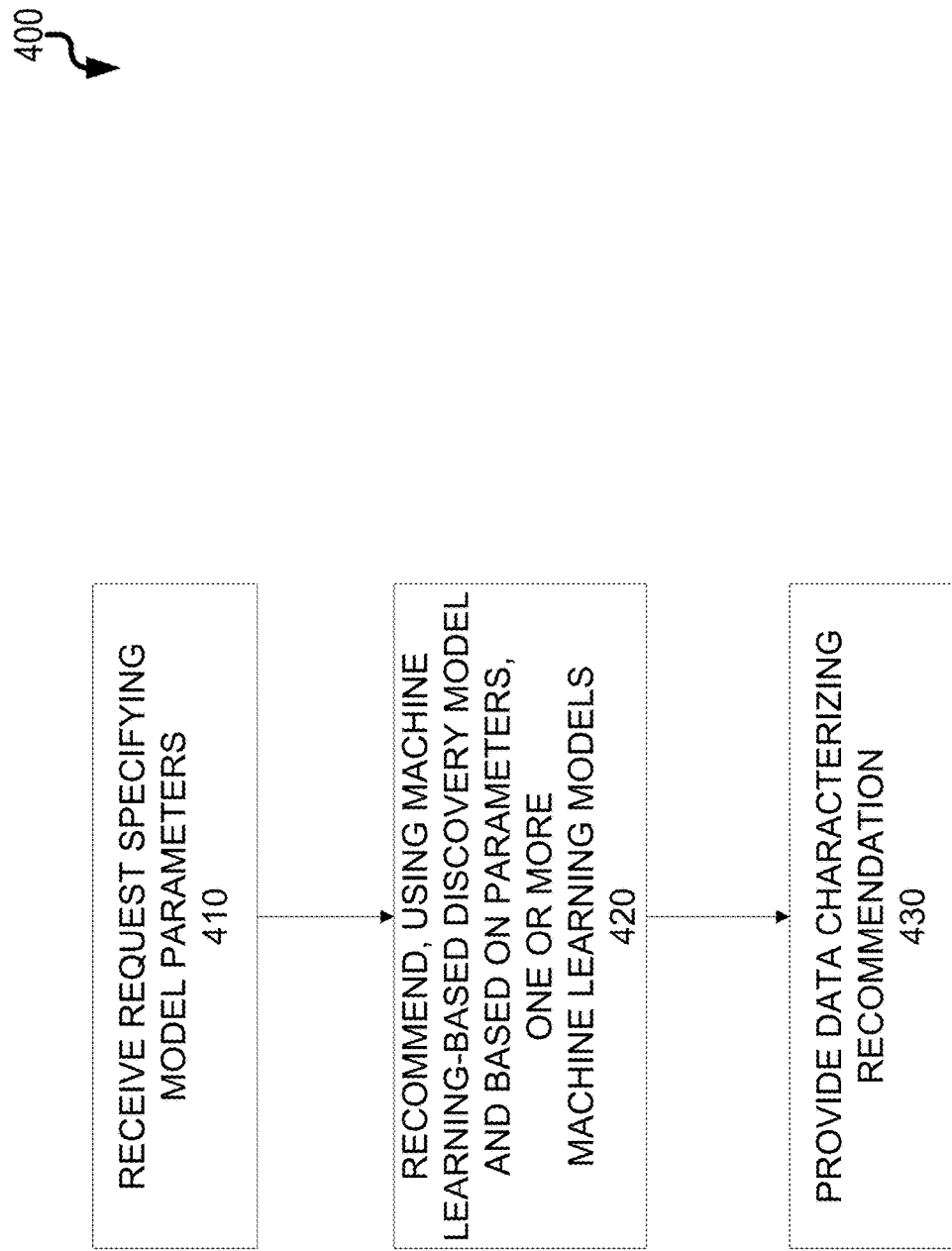
FIG. 4 is process flow diagram illustrating machine-learning based recommendation of machine learning models.

FIG. 4 is a process flow diagram illustrating the reuse of a machine learning models in which, at 410, a request is received for a machine learning model recommendation that specifies parameters associated with a desired machine learning model (e.g., schema, etc.). Thereafter, at 420, a machine learning-based discovery model, recommend at least one machine learning model (to reuse) based on the parameters specified in the request. Next, at 430, data characterizing the recommended at least one machine learning model is provided (e.g., loaded into memory, displayed in a graphical user interface, transmitted to a remote computing system, and/or stored in physical persistence, etc.). In some variations, a graphical user interface can be rendered that allows a client application to select one of the recommended machine learning models and, further optionally, to active the selected machine learning models.

Figure 5:
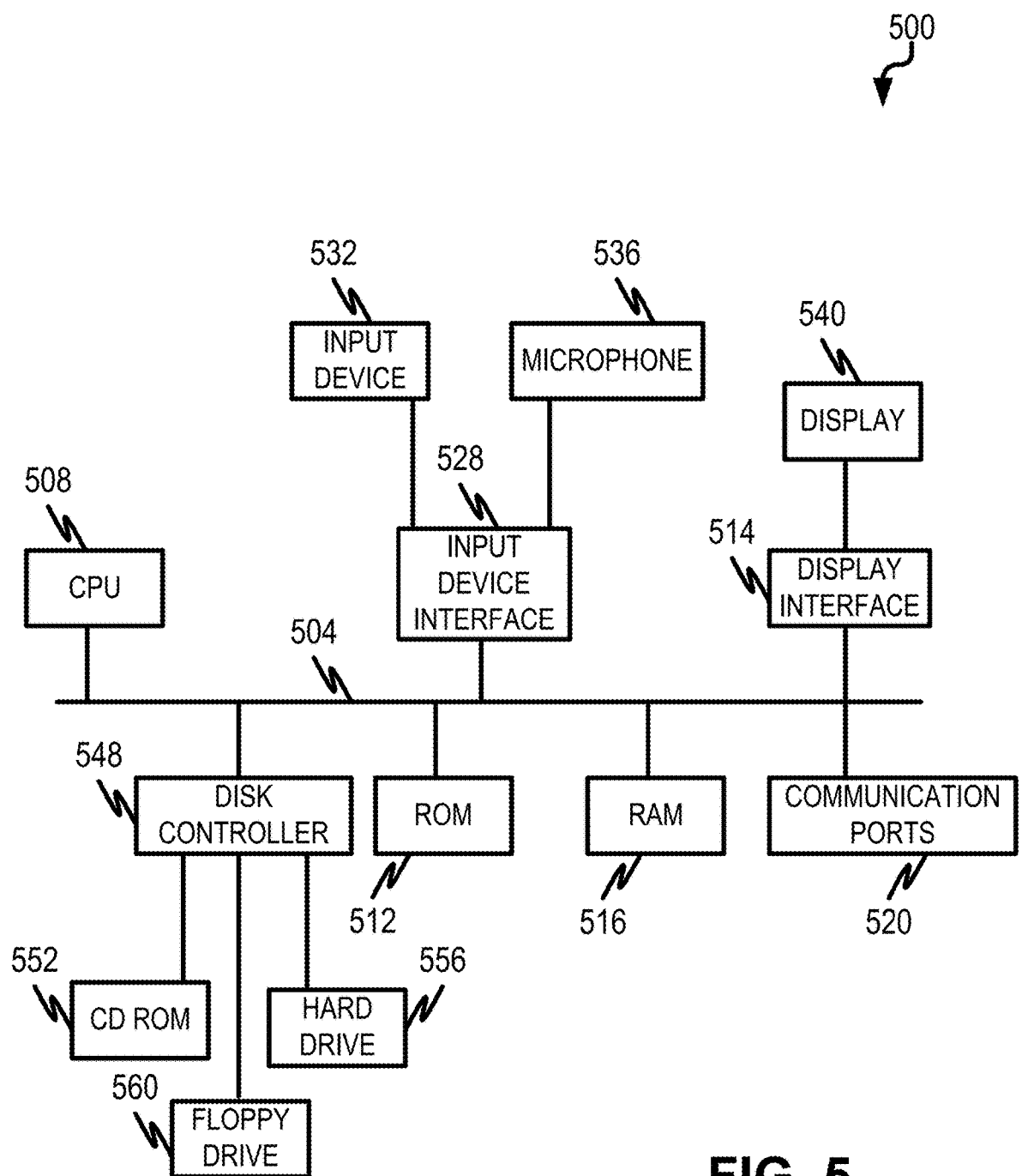
FIG. 5 is a diagram illustrating a computing device for implementing aspects of the current subject matter.

FIG. 5 is a diagram 500 illustrating a sample computing device architecture for implementing various aspects described herein. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface with one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the at least one communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 via a display interface 514 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. The input device 532 and the microphone 536 can be coupled to and convey information via the bus 504 by way of an input device interface 528. Other computing devices, such as dedicated servers, can omit one or more of the display 540 and display interface 514, the input device 532, the microphone 536, and input device interface 528.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. For example, the current architecture can be used in connection with different applications including identification of appropriate forms/templates such as that described in co-pending application entitled: "Sourcing Object Creation From Natural Language Inputs" filed concurrently herewith and assigned U.S. patent application Ser. No. 16/656,255, the contents of which are hereby fully incorporated by reference. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
receiving a request for a recommendation for one or more machine learning models in a group of pre-determined, reusable machine learning models in a model repository, the respective pre-determined, reusable machine learning models having a defined schema, the request encapsulating parameters for a desired machine learning model, the encapsulated parameters including one or more of an application, a request type, a technical stack, an input type, or a desired prediction;
processing the request, including extracting features from the request, and inputting the processed request, including the extracted features, into a machine learning-based discovery model;
identifying, by the machine learning-based discovery model using the encapsulated parameters of the received request, at least one recommended pre-determined, reusable machine learning model responsive to the request, wherein an aggregator layer searches the model repository for common fields within the defined schemas of the pre-determined, reusable machine learning models in the model repository and forms a link amongst multiple pre-determined, reusable machine learning models having the common fields to form an aggregated output from the multiple pre-determined, reusable machine learning models, and wherein the aggregator layer is built using a template when an Application Programming Interface (API) corresponding to the at least one recommended pre-determined, reusable machine learning model is not already available; and
providing data characterizing the at least one recommended pre-determined, reusable machine learning model, including outputting a respective Application Programming Interface (API) corresponding to one or more of the at least one recommended pre-determined reusable machine learning model.

2. The method of claim 1, wherein the providing data comprises:
causing information describing the at least one recommended machine learning model to be displayed in a graphical user interface on a client computing device.

3. The method of claim 2 further comprising:
receiving user-generated input selecting one of the at least one recommended machine learning model displayed in the graphical user interface; and
causing the selected recommended machine learning model to be activated.

4. The method of claim 1, wherein the discovery model comprises a neural network.

5. The method of claim 1, wherein the providing data comprises at least one of:
transmitting the data characterizing the at least one recommended machine learning model to a remote computing system, storing the data characterizing the at least one recommended machine learning model in physical persistence, or loading the data characterizing the at least one recommended machine learning model into memory.

6. A system comprising:
at least one data processor; and
memory storing instructions which, when executed by the at least one data processor, result in operations comprising:
receiving a request for a recommendation for one or more machine learning models in a group of pre-determined, reusable machine learning models in a model repository, the respective pre-determined, reusable machine learning models including metadata that describes a respective defined schema, the request encapsulating parameters for a desired machine learning model, wherein the encapsulated parameters include one or more of an application, a request type, a technical stack, an input type, or a desired prediction;
identifying, by a machine learning-based discovery model using the encapsulated parameters including one or more of the application, the request type, the technical stack, the input type, or the desired prediction, at least one recommended machine learning model, from the group of pre-determined, reusable machine learning models, that are usable to address the request, wherein an aggregator layer searches the model repository for common fields within the pre-determined, reusable machine learning models in the model repository and forms a link amongst multiple pre-determined, reusable machine learning models having common fields to combine the outputs from the multiple pre-determined, reusable machine learning models and form an aggregated output from such multiple pre-determined, reusable machine learning models, and wherein the aggregator layer is built using a template when an Application Programming Interface (API) corresponding to the at least one recommended pre-determined, reusable machine learning model is not already available; and
providing data characterizing the at least one recommended pre-determined, reusable machine learning model.

7. The system of claim 6, wherein the providing data comprises:
causing information describing the at least one recommended machine learning model to be displayed in a graphical user interface on a client computing device.

8. The system of claim 7, wherein the operations further comprise:
receiving user-generated input selecting one of the at least one recommended machine learning model displayed in the graphical user interface; and
causing the selected recommended machine learning model to be activated.

9. The system of claim 6, wherein searching the model repository for common fields comprises searching the model repository for common fields.

10. The system of claim 6, wherein the discovery model comprises a neural network.

11. The system of claim 6, wherein the providing data comprises at least one of:
transmitting the data characterizing the at least one recommended machine learning model to a remote computing system, storing the data characterizing the at least one recommended machine learning model in physical persistence, or loading the data characterizing the at least one recommended machine learning model into memory.

12. A non-transitory computer program product storing instructions which, when executed by at least one computing device, result in operations comprising:
receiving a request for a recommendation for one or more machine learning models in a group of pre-determined, reusable machine learning models in a model repository, the respective pre-determined, reusable machine learning models having a respective defined schema, the request encapsulating parameters for a desired machine learning model, the encapsulated parameters including one or more of an application, a request type, a technical stack, an input type, or a desired prediction;
extracting features from the request and inputting the extracted features into a machine learning-based discovery model;
identifying, by the machine learning-based discovery model using the encapsulated parameters including one or more of the application, the request type, the technical stack, the input type, or the desired prediction, at least one recommended pre-determined, reusable machine learning model corresponding to the request, wherein an aggregator layer searches the model repository for common fields within the schemas of the pre-determined, reusable machine learning models in the model repository and forms a link amongst multiple pre-determined, reusable machine learning models having the common fields to form an aggregated output from the multiple pre-determined, reusable machine learning models, and wherein the aggregator layer is built using a template when an Application Programming Interface (API) corresponding to the at least one recommended pre-determined, reusable machine learning model is not already available; and
providing data characterizing one or more of the aggregated output or the at least one recommended pre-determined, reusable machine learning model.

13. The computer program product of claim 12, wherein the providing data comprises:
causing information describing the at least one recommended machine learning model to be displayed in a graphical user interface on a client computing device.

14. The computer program product of claim 13, wherein the operations further comprise:
receiving user-generated input selecting one of the at least one recommended machine learning model displayed in the graphical user interface; and
causing the selected recommended machine learning model to be activated.

15. The computer program product of claim 12, wherein the respective pre-determined, reusable machine learning models include respective metadata that describe one or more of the respective defined schema or a respective functionality of the respective pre-determined, reusable machine learning models.

16. The computer program product of claim 12, wherein the discovery model comprises a neural network.

* * * * *